US008650644B1

(12) United States Patent
Ranjan et al.

(10) Patent No.: US 8,650,644 B1
(45) Date of Patent: Feb. 11, 2014

(54) COMPRESSED DATA PATTERN MATCHING

(75) Inventors: Rajiv Ranjan, Sunnyvale, CA (US); Sunil Ravi, Pleasanton, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 54 days.

(21) Appl. No.: 13/338,403

(22) Filed: Dec. 28, 2011

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC .................... 726/23; 726/22; 726/24; 726/25

(58) Field of Classification Search
USPC ......................................... 726/23, 22, 24, 25
See application file for complete search history.

(56) References Cited

U.S. PATENT DOCUMENTS

| 7,737,870 | B1* | 6/2010 | Wang ............................... 341/65 |
| 7,966,424 | B2 | 6/2011 | Abdo et al. | |
| 2002/0188926 | A1* | 12/2002 | Hearnden ...................... 717/100 |
| 2003/0074573 | A1* | 4/2003 | Hursey et al. ................. 713/200 |
| 2003/0115479 | A1* | 6/2003 | Edwards et al. ............... 713/200 |
| 2005/0210151 | A1* | 9/2005 | Abdo et al. ..................... 709/247 |
| 2007/0208689 | A1* | 9/2007 | Park .................................. 707/1 |
| 2008/0222177 | A1* | 9/2008 | Ramer .......................... 707/101 |
| 2009/0271181 | A1* | 10/2009 | Balegar et al. .................. 704/10 |
| 2010/0306849 | A1* | 12/2010 | Zheng et al. .................... 726/24 |
| 2011/0093694 | A1 | 4/2011 | Nedbal et al. | |

* cited by examiner

*Primary Examiner* — Kambiz Zand
*Assistant Examiner* — Benjamin Kaplan
(74) *Attorney, Agent, or Firm* — Harrity & Harrity, LLP

(57) ABSTRACT

A computing device may receive compressed data that includes a sequence of references corresponding to dictionary words used to compress the compressed data. The computing device may obtain the dictionary words used to compress the compressed data, and identify malicious content corresponding to one or more of the dictionary words. The computing device may also identify malicious content corresponding to the compressed data based on the one or more dictionary words and produce a notification of the malicious content corresponding to the compressed data.

20 Claims, 8 Drawing Sheets

COMPRESSED DATA PATTERN MATCHING

BACKGROUND

Currently available network security processes include scanning data for malicious content. However, such processes frequently provide inadequate solutions to network security. For example, scanning compressed data for malicious content often requires that the data be decompressed prior to scanning. As such, currently available solutions can be a prohibitive drain on network resources, such as processing capacity and memory capacity.

SUMMARY

In one potential implementation, a method may include receiving, by a computing device, compressed data. The compressed data may include a sequence of references that each correspond to a dictionary word used to compress the compressed data. The method may include obtaining, by the computing device, dictionary words used to compress the compressed data and identifying, by the computing device, one or more dictionary words corresponding to malicious content. The method may include identifying, by the computing device, malicious content corresponding to the compressed data based on the one or more dictionary words and producing, by the computing device, a notification of the malicious content corresponding to the compressed data.

In another potential implementation, a computing device may include a memory to store instructions and a processor, connected to the memory, to execute the instructions to receive compressed data that includes a sequence of references that correspond to dictionary words used to compress the compressed data. The processor may obtain the dictionary words used to compress the compressed data and identify one or more of the dictionary words corresponding to malicious content. The processor may store the dictionary words identified as corresponding to malicious content, discard the dictionary words that are not identified as corresponding to malicious content, and use the stored dictionary words to identify malicious content corresponding to the compressed data.

In another potential implementation, one or more non-transitory computer-readable storage media may include one or more instructions that, when executed by a processor, cause the processor to receive compressed data that includes a sequence of references that each correspond to dictionary words used to compress the compressed data. The one or more instructions may cause the processor to obtain the dictionary words used to compress the compressed data and identify one or more dictionary words that corresponding to malicious content. The one or more instructions may cause the processor to decompress a portion of the compressed data corresponding to the dictionary words, and scan the decompressed portion of the compressed data to identify the malicious content corresponding to the compressed data.

DETAILED DESCRIPTION OF PREFERRED EMBODIMENTS

The following detailed description refers to the accompanying drawings. The same labels and/or reference numbers in different drawings may identify the same or similar elements.

In one or more implementations, described herein, devices may be used to optimize the detection of malicious content corresponding to compressed data. For example, a network security system may receive compressed data (or a compressed data stream), identify dictionary words corresponding to the compressed data, and/or identify malicious content corresponding to the dictionary words. Additionally, or alternatively, the network security system may identify malicious content corresponding to the compressed data and may produce a notification of malicious content. Identifying malicious content corresponding to the dictionary words, prior to identifying the malicious content corresponding to the compressed data, may enhance efficiency by eliminating the need to decompress and inspect certain portions of the compressed data (e.g., portions of the compressed data corresponding to dictionary words that are not associated with malicious content).

Figure 1:
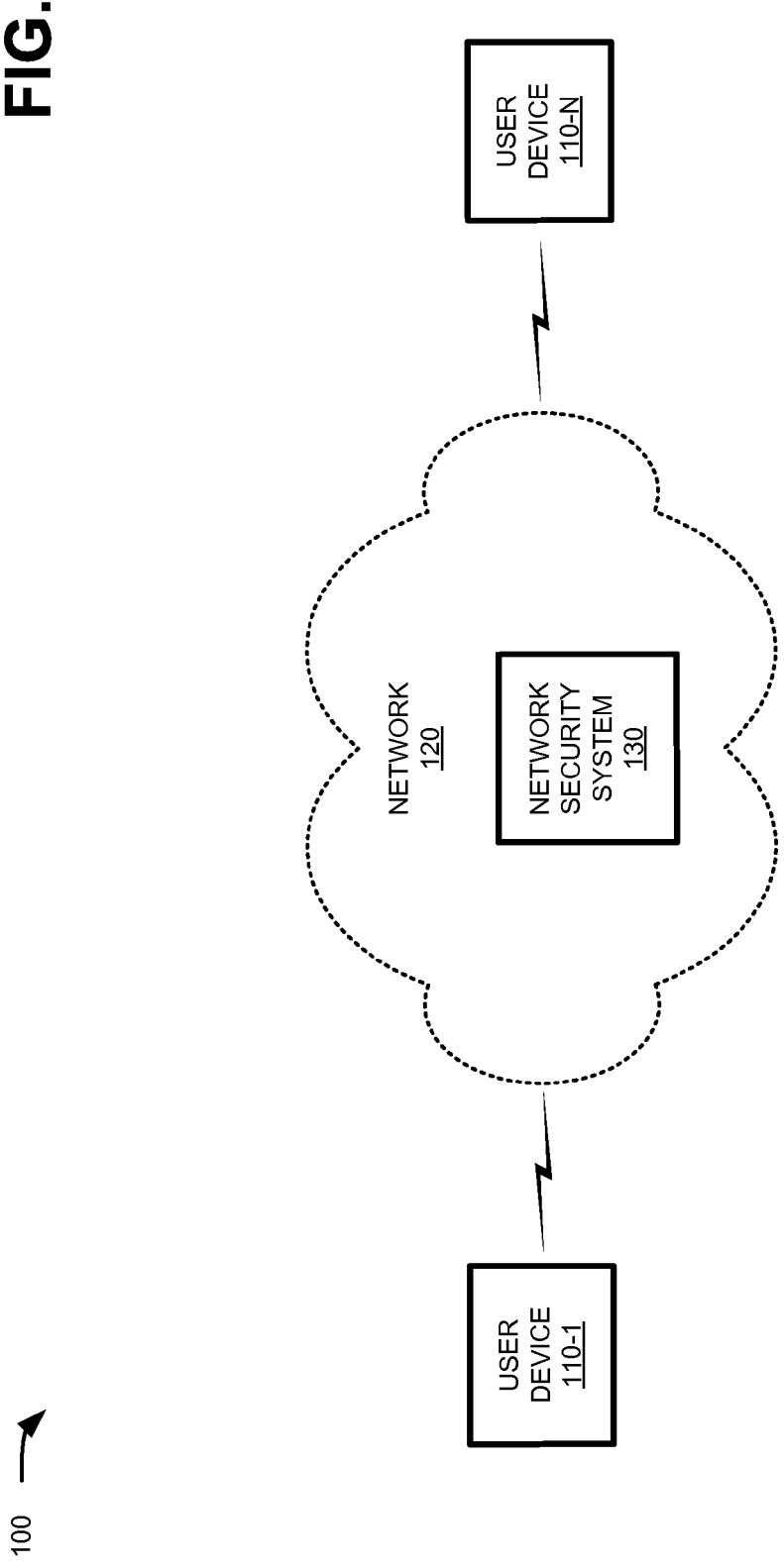
FIG. 1 is a diagram of an example environment in which systems and/or methods, described herein, may be implemented.

FIG. 1 is a diagram of an example environment 100 in which systems and/or methods, described herein, may be implemented. As depicted, environment 100 may include user devices 110-1, . . . , 110-N (where N≥1) (hereinafter referred to individually as "user device 110," and collectively as "user devices 110"), network 120, and network security system 130.

The number of devices and/or networks, illustrated in FIG. 1, is provided for explanatory purposes only. In practice, there may be additional devices and/or networks, fewer devices and/or networks, different devices and/or networks, or differently arranged devices and/or networks than illustrated in FIG. 1.

Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

User device 110 may include one or more types of computing and/or communication devices. For example, user device 110 may include a laptop computer, a desktop computer, a tablet computer, a mobile telephone (e.g., a smart phone), a server, a cluster of servers, a router, or one or more other types of computing and/or communication devices. In one example, user device 110 may communicate with network 120.

Network 120 may include any type of network and/or combination of networks. For example, network 120 may include a LAN (e.g., an Ethernet network), a wireless LAN (WLAN) (e.g., an 802.11 network), a wide area network (WAN) (e.g., the Internet), a wireless WAN (WWAN) (e.g., a 3gpp System Architecture Evolution (SAE) Long-Term Evolution (LTE) network, a Global System for Mobile Communications (GSM) network, a Universal Mobile Telecommunications System (UMTS) network, a Code Division Multiple Access 2000 (CDMA2000) network, a High-Speed Packet Access (HSPA) network, a Worldwide Interoperability for Microwave Access (WiMAX) network, etc.). Additionally, or alternatively, network 120 may include a fiber optic network, a metropolitan area network (MAN), an ad hoc network, a virtual network (e.g., a virtual private network (VPN)), a telephone network (e.g., a Public Switched Telephone Network (PSTN)), a cellular network, a Voice over IP (VoIP) network, or another type of network.

Network security system 130 may include one or more types of computing and/or communication devices. For example, network security system 130 may include a server, a cluster of servers, a router, a gateway, a switch, an intrusion detection system, a firewall, or one or more other types of computing and/or communication devices. In one example, network security system 130 may receive compressed data, identify dictionary words (also referred to herein as "dictionary-based compression words") corresponding to the compressed data, and/or identify malicious content corresponding to the dictionary words. Additionally, or alternatively, network security system 130 may identify malicious content corresponding to the compressed data and may produce a notification of malicious content.

Figure 2:
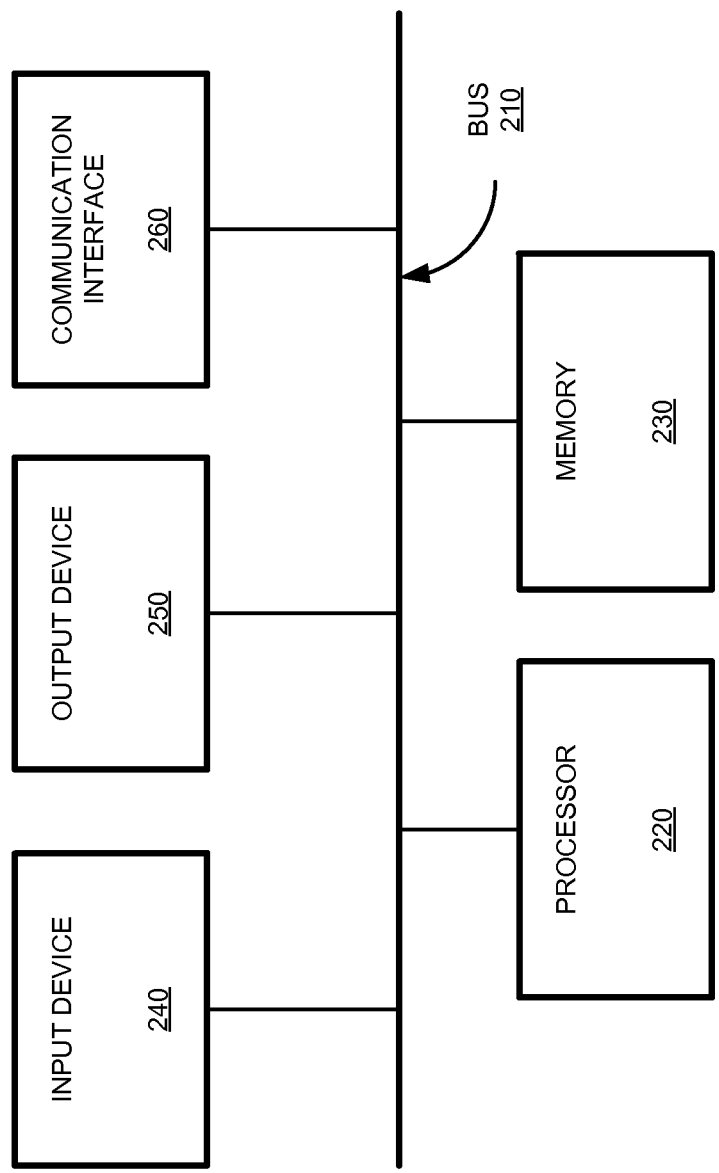
FIG. 2 is a diagram of an example device of FIG. 1 according to one or more implementations described herein.

FIG. 2 is a diagram of example components of a device 200 that may be used within environment 100 of FIG. 1. Device 200 may correspond to user device 110 and/or network security system 130. Each of user device 110 and/or network security system 130 may include one or more of devices 200 and/or one or more of the components of device 200.

As depicted, device 200 may include bus 210, processor 220, memory 230, input device 240, output device 250, and communication interface 260. However, the precise components of device 200 may vary between implementations. For example, depending on the implementation, device 200 may include fewer components, additional components, different components, or differently arranged components than those illustrated in FIG. 2.

Bus 210 may permit communication among the components of device 200. Processor 220 may include one or more processors, microprocessors, data processors, co-processors, network processors, application-specific integrated circuits (ASICs), controllers, programmable logic devices (PLDs), chipsets, field-programmable gate arrays (FPGAs), or other components that may interpret or execute instructions or data. Processor 220 may control the overall operation, or a portion thereof, of device 200, based on, for example, an operating system (not illustrated) and/or various applications. Processor 220 may access instructions from memory 230, from other components of device 200, or from a source external to device 200 (e.g., a network or another device).

Memory 230 may include memory and/or secondary storage. For example, memory 230 may include random access memory (RAM), dynamic RAM (DRAM), read-only memory (ROM), programmable ROM (PROM), flash memory, or some other type of memory. Memory 230 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 240 may include one or more components that permit a user to input information into device 200. For example, input device 240 may include a keypad, a button, a switch, a knob, fingerprint recognition logic, retinal scan logic, a web cam, voice recognition logic, a touchpad, an input port, a microphone, a display, or some other type of input component. Output device 250 may include one or more components that permit device 200 to output information to a user. For example, output device 250 may include a display, light-emitting diodes (LEDs), an output port, a speaker, or some other type of output component.

Communication interface 260 may include one or more components that permit device 200 to communicate with other devices or networks. For example, communication interface 260 may include some type of wireless or wired interface. Communication interface 260 may also include an antenna (or a set of antennas) that permit wireless communication, such as the transmission and reception of radio frequency (RF) signals.

As described herein, device 200 may perform certain operations in response to processor 220 executing software instructions contained in a computer-readable medium, such as memory 230. The software instructions may be read into memory 230 from another computer-readable medium or from another device via communication interface 260. The software instructions contained in memory 230 may cause processor 220 to perform one or more processes described herein. Alternatively, hardwired circuitry may be used in place of, or in combination with, software instructions to implement processes described herein. Thus, implementations described herein are not limited to any specific combination of hardware circuitry and software.

The number of components, illustrated in FIG. 2, is provided for explanatory purposes only. In practice, there may be additional components, fewer components, different components, or differently arranged components than illustrated in FIG. 2.

Figure 3:
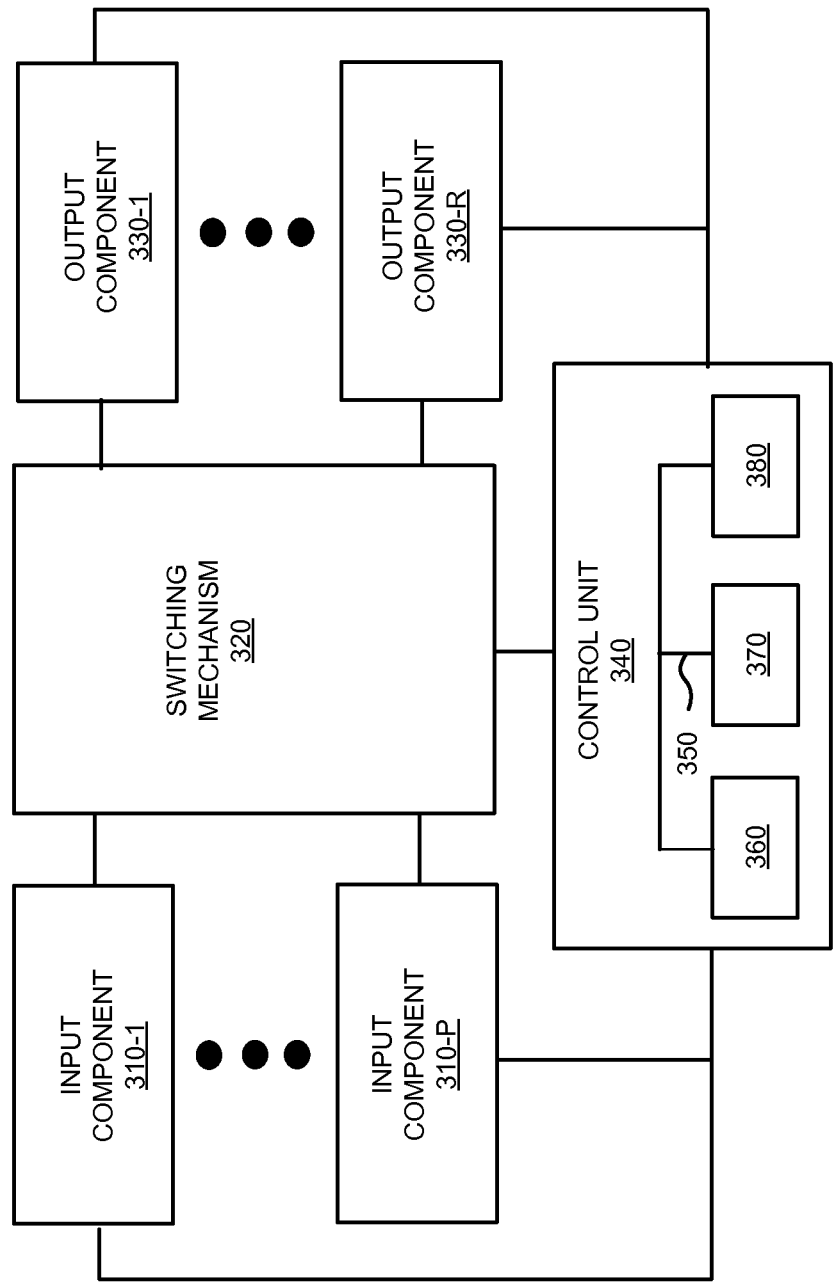
FIG. 3 is a diagram of an example network security system of FIG. 1 according to one or more implementations described herein.

FIG. 3 is a diagram of an example network device 300 that may be used within environment 100. For example, since network security system 130 may include a network device, such as a router, a gateway, a firewall, an intrusion detection and/or protection system, a switch, etc., network device 300 may correspond to network security system 130. In addition, network security system 130 may include one or more network devices 300 and/or one or more of the components of network device 300.

As depicted, network device 300 may include input components 310-1, . . . , 310-P (where P≥1) (collectively referred to as "input components 310," and individually as "input component 310"), switching mechanism 320, output components 330-1, . . . , 330-R (where R≥1) (collectively referred to as "output components 330," and individually as "output component 330"), and control unit 340 (which may include bus 350, processor 360, memory 370, and communication interface 380). However, the precise components of network device 300 may vary between implementations. For example, depending on the implementation, network device 300 may include fewer components, additional components, different components, or differently arranged components than those illustrated in FIG. 3.

Input components 310 may be points of attachment for physical links and may be the points of entry for incoming traffic. Input components 310 may perform datalink layer encapsulation and/or decapsulation. Input components 310 may look up a destination address of incoming traffic (e.g., any type or form of data, such as packet data or non-packet data) in a forwarding table (e.g., a media access control (MAC) table) to determine a destination component or a destination port for the data (e.g., a route lookup). In order to provide quality of service (QoS) guarantees, input ports 310 may classify traffic into predefined service classes. Input ports 310 may run datalink-level protocols and/or network-level protocols.

Switching mechanism 320 may include a switching fabric that provides links between input components 310 and output components 330. For example, switching mechanism 320 may include a group of switching devices that route traffic from input components 310 to output components 330.

Output components 330 may store traffic and may schedule traffic on one or more output physical links. Output components 330 may include scheduling algorithms that support priorities and guarantees. Output components 330 may support datalink layer encapsulation and decapsulation, and/or a variety of higher-level protocols.

Control unit 340 may interconnect with input components 310, switching mechanism 320, and output components 330. Control unit 340 may perform control plane processing, including computing and updating forwarding tables, manipulating QoS tables, maintaining control protocols, etc. Control unit 340 may process any traffic whose destination address may not be found in the forwarding table.

In one embodiment, control unit 340 may include a bus 350 that may include one or more paths that permits communication among processor 360, memory 370, and communication interface 380. Processor 360 may include a microprocessor or processing logic (e.g., an application specific integrated circuit (ASIC), field programmable gate array (FPGA), etc.) that may interpret and execute instructions, programs, or data structures. Processor 360 may control operation of network device 300 and/or one or more of the components of network device 300.

Memory 370 may include a random access memory or another type of dynamic storage device that may store information and/or instructions for execution by processor 360, a read only memory or another type of static storage device that may store static information and/or instructions for use by processor 360, a flash memory (e.g., an electrically erasable programmable read only memory (EEPROM)) device for storing information and/or instructions, and/or some other type of magnetic or optical recording medium and its corresponding drive. Memory 370 may also store temporary variables or other intermediate information during execution of instructions by processor 360.

Communication interface 380 may include any transceiver-like mechanism that enables control unit 340 to communicate with other devices and/or systems. For example, communication interface 380 may include a modem or an Ethernet interface to a LAN. Additionally or alternatively, communication interface 380 may include mechanisms for communicating via a wireless network (e.g., a WLAN and/or a WWAN). Communication interface 380 may also include a console port that may allow a user to interact with control unit 340 via, for example, a command line interface. A user may configure network device 300 via a console port (not shown in FIG. 3).

Network device 300 may perform certain operations, as described in detail herein. Network device 300 may perform these operations in response to, for example, processor 360 executing software instructions (e.g., computer program(s)) contained in a computer-readable medium, such as memory 370, a secondary storage device (e.g., hard disk, CD-ROM, etc.), or other forms of RAM or ROM.

The software instructions may be read into memory 370 from another computer-readable medium, such as a data storage device, or from another device via communication interface 380. The software instructions contained in memory 370 may cause processor 360 to perform processes that will be described later. Alternatively, hardwired circuitry may be used in place of, or in combination with, software instructions to implement processes described herein. Thus, implementations described herein are not limited to any specific combination of hardware circuitry and software.

Figure 4:
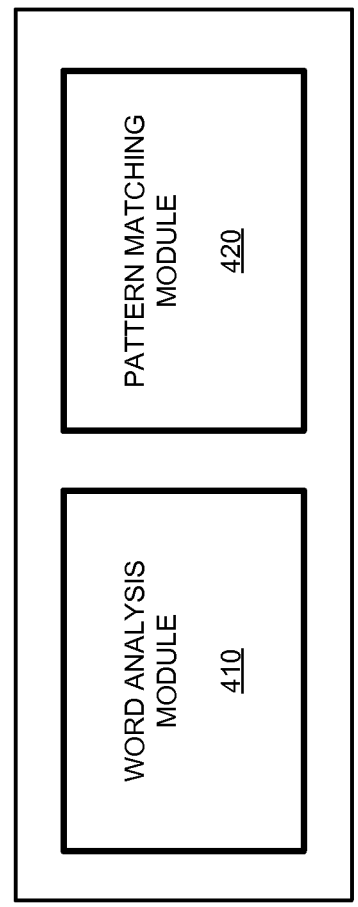
FIG. 4 is a diagram of example functional components of a network security system according to one or more implementations described herein.

FIG. 4 is a diagram of example functional components of network security system 130 according to one or more implementations described herein. As depicted, network security system 130 may include word analysis module 410 and pattern matching module 420. Depending on the implementation, one or more of modules 410-420 may be implemented as a combination of hardware and software based on the components illustrated and described with respect to FIGS. 2 and/or 3. Alternatively, modules 410-420 may each be implemented as hardware based on the components illustrated and described with respect to FIGS. 2 and/or 3.

Word analysis module 410 may provide functionality regarding dictionary words. For example, word analysis module 410 may enable network security system 130 to receive compressed data, obtain dictionary words corresponding to the compressed data, and/or identify malicious content corresponding to the dictionary words. In one example, word analysis module 410 may enable network security system 130 to identify malicious content corresponding to the dictionary words by executing one or more suffix tree (e.g., a pattern (PAT) tree, a position tree, etc.) operations and/or one or more pattern matching operations (e.g., a signature scanning operation, etc.). Using suffix tree operations and/or pattern matching operations may enable network security system 130 to isolate the dictionary words that correspond to malicious content.

Pattern matching module 420 may provide functionality regarding pattern matching. For example, pattern matching module 420 may enable network security system 130 to identify malicious content corresponding to the compressed data and/or produce a notification of the malicious content. In one example, pattern matching module 420 may enable network security system 130 to identify malicious content based on the dictionary words identified as corresponding to malicious content. Focusing on the dictionary words identified as corresponding to malicious content may enable network security system 130 to increase efficiently by focusing system resources (e.g., processing capacity, memory capacity, etc.) on relevant portions of the compressed data.

In addition to the functionality described above, the functional components of network security system 130 may also, or alternatively, provide functionality as described elsewhere in this description. Further, while FIG. 4 shows a particular number and arrangement of modules, in alternative implementations, network security system 130 may include additional modules, fewer modules, different modules, or differently arranged modules than those depicted.

Figure 5:
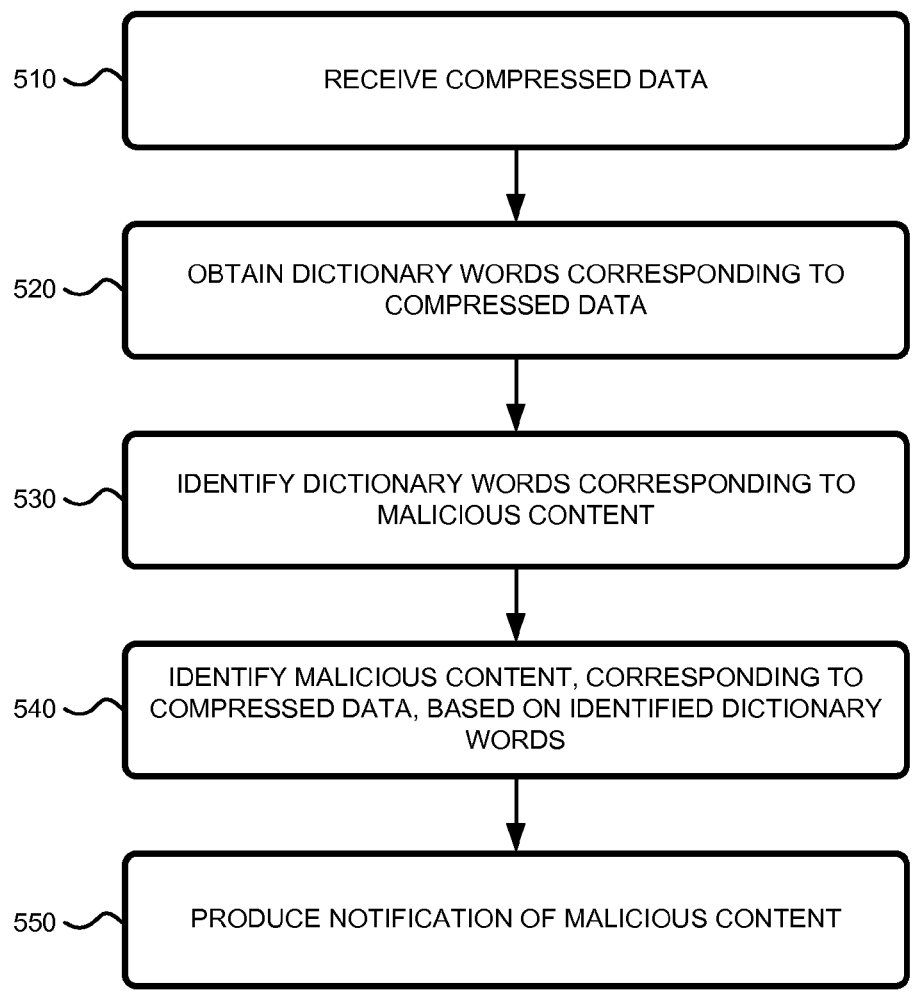
FIG. 5 is a diagram of an example process for compressed data pattern matching according to one or more implementations described herein.

FIG. 5 is a diagram of an example process 500 for compressed data pattern matching according to one or more implementations described herein. In one or more implementations, process 500 may be performed by one or more components of network security system 130. In other implementations, some or all of process 500 may be performed by one or more other components/devices, or a group of components/devices, including or excluding network security system 130.

As depicted in FIG. 5, process 500 may include receiving compressed data (and/or a compressed data stream, where sub-parts of the compressed content are received by the system at any given point in time) (block 510). In one example, network security system 130 may receive the compressed data from another network device and/or user device 110. Compressed data may include any type or combination of information (e.g., a document file, an audio file, a video file, etc.) that has been compressed according to one or more data compression applications or techniques, such as GNU zip (GZIP), Phil Katz zip (PKZIP), portable network graphics (PNG), Lempel-Ziv-Welch (LZW), etc.

Process 500 may also include obtaining dictionary words corresponding to the compressed data (block 520). In one example, the dictionary words may correspond to the type and/or version of data compression applications or techniques used to compress the compressed data. For instance, if GZIP was used to compress the compressed data, GZIP may be used to obtain the dictionary words corresponding to the compressed data. In some implementations, network security system 130 may obtain the dictionary words by, for example, analyzing the compressed data to identify a data compression application that is compatible with the compressed data, executing the data decompression/compression application, and/or accessing the dictionary words via the data decompression/compression application.

As depicted in FIG. 5, process 500 may include identifying malicious content corresponding to the dictionary words (block 530). As mentioned above, in one or more implementations, network security system 130 may identify malicious content by executing one or more suffix tree operations and/or pattern matching operations. In one example, the suffix tree operations and pattern matching operations may be implemented in a cooperative manner to optimize the detection of malicious content corresponding to one or more, or a part of one or more, dictionary words. An example of such suffix tree operations and pattern matching operations is discussed below with reference to FIGS. 6-7.

Process 500 may also include identifying malicious content, corresponding to the compressed data, based on the identified dictionary words (block 540). In one example, network security system 130 may identify the malicious content corresponding to the compressed data by decompressing portions of the compressed data that correspond to the identified dictionary words and/or scanning the decompressed data for malicious content. Additionally, or alternatively, the dictionary words used to identify malicious content corresponding to the compressed data may be dictionary words identified by the suffix tree operations and/or pattern matching operations discussed above.

As depicted in FIG. 5, process 500 may include producing a notification of the malicious content (block 550). For example, network security system 130 may produce a notification of the malicious content. In some implementations, the notification may include any type or variety of information, such as information corresponding to the compressed data, the dictionary words, the malicious content, etc. For instance, the notification may include information identifying the compressed data and the malicious content identified within the compressed data. In one example, the notification may also, or alternatively, include a description of the type of malicious content identified. Network security system 130 may also, or alternatively, communicate the notification to another device (e.g., another network device, a user device 110, etc.).

While FIG. 5 shows a flowchart diagram of an example process 500 for compressed data pattern matching, in other implementations, a process for compressed data pattern matching may include fewer operations, different operations, differently arranged operations, or additional operations than depicted in FIG. 5.

For example, network security system 130 may execute one or more security operations and/or processes in response to identifying the malicious content corresponding to the compressed data. The security operation and/or process may be capable of neutralizing a threat corresponding to the malicious content. For instance, network security system 130 may delete the compressed data, prohibit the compressed data from being communicated via network 120, remove the malicious content from the compressed data, neutralize the malicious content within the compressed data, quarantine the compressed data, etc.

Figure 6:
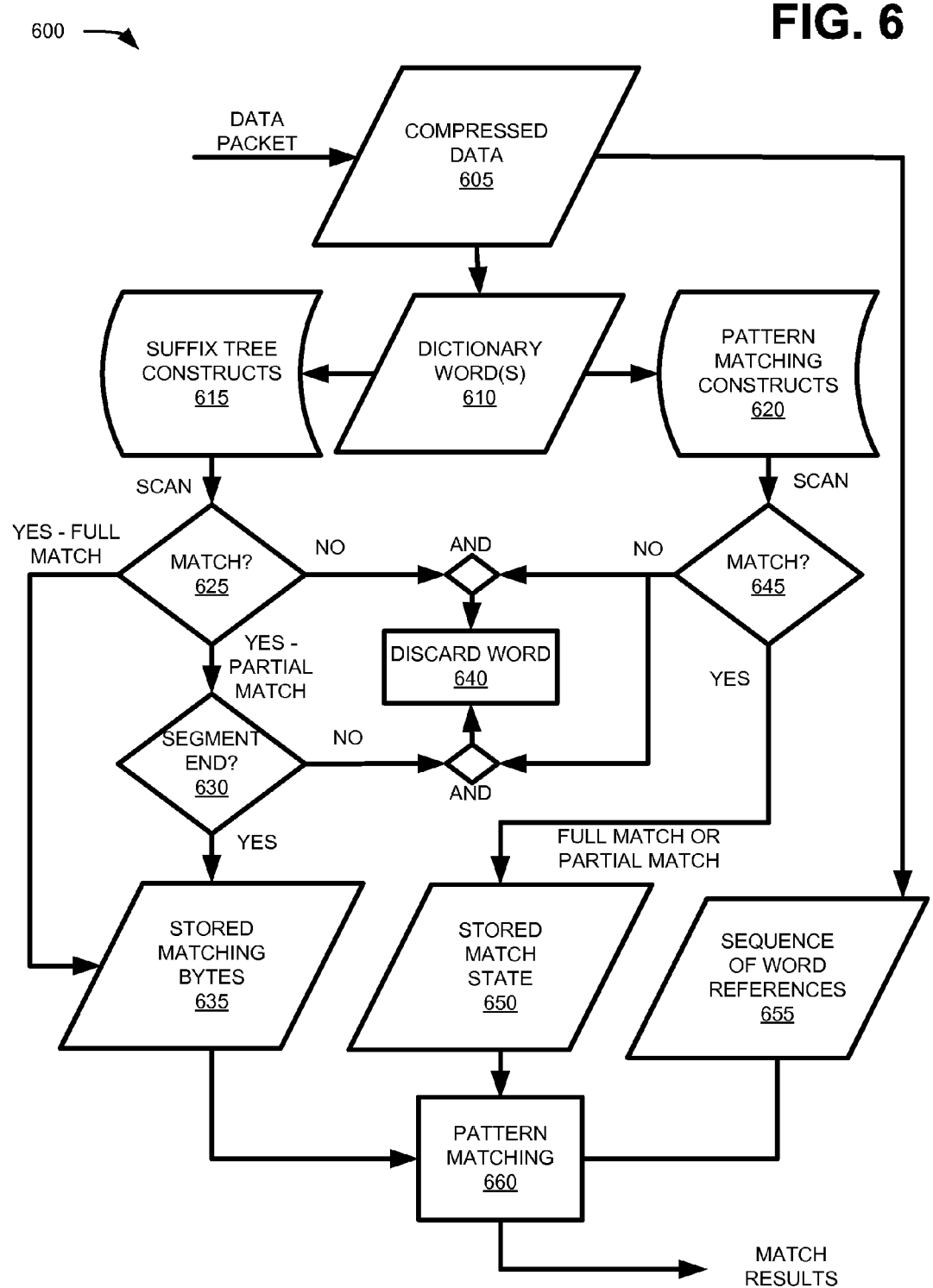
FIG. 6 is a diagram of an example of the process of FIG. 5 according to one or more implementations described herein.

FIG. 6 is a diagram of an example 600 of process 500 of FIG. 5. In one or more implementations, example 600 may be performed by one or more components of network security system 130. In other implementations, some or all of example 600 may be performed by one or more other components/devices, or a group of components/devices, including or excluding network security system 130. A description of FIG. 6 is provided below with reference to FIG. 7A-7B.

As depicted in FIG. 6, network security system 130 may receive a data packet that includes compressed data 605. Network security system 130 may also, or alternatively, obtain one or more dictionary words 610 based on, or otherwise corresponding to, compressed data 605. Network security system 130 may also, or alternatively, scan dictionary words 610 using suffix tree constructs 615 and/or pattern matching constructs 620.

The suffix tree constructs and/or the pattern matching constructs may each include one or more sequences of bytes (or another type of information) corresponding to malicious content. In some implementations, the byte sequences corresponding to suffix tree constructs 615 may be arranged, formatted, and/or organized in a manner that is consistent with executing one or more suffix tree operations. Similarly, the byte sequences corresponding to pattern matching constructs 620 may be arranged, formatted, and/or organized in a manner that is consistent with executing one or more scanning operations. Additionally, or alternatively, the suffix tree constructs and/or the pattern matching constructs may include one or more sub-patterns of information corresponding to malicious content.

Scanning a particular dictionary word 610 using suffix tree constructs 615 may result in a full match scenario, a partial match scenario, or a no match scenario (see, for example, match decisions 625 and 630). As depicted in FIG. 6, a full match scenario may result in the sequence of matching bytes to be stored (e.g., stored matching bytes 635). Similarly, a partial match scenario may result in the sequence of matching bytes being stored (e.g., stored matching bytes 635) when the partial match includes a segment end of dictionary word 610. However, a partial match scenario that does not include a segment end of dictionary word 610 and/or a no match scenario may result in dictionary word 610 being discarded or otherwise removed from memory (e.g., discard word operation 640). Even though this proposal may make an explicit choice of saving full/partial dictionary words instead of the suffix-tree state, in practice, it may be possible to save the suffix-tree state and either reconstruct the full/partial dictionary words for later use or reuse the suffix-tree state for further match processing. The choice of saving dictionary words versus suffix tree state may be dependent on the hardware/software system on which one or more features, described herein, are implemented.

Scanning dictionary word 610 using pattern matching constructs 620 may result in a full match scenario, a partial match scenario, or a no match scenario (see, for example, match decision 645). As depicted in FIG. 6, a full match scenario and/or a partial match scenario may result in a corresponding match state being stored (e.g., stored match state 650). However, a no match scenario may result in dictionary word 610 being discarded or otherwise removed from memory (e.g., discard word operation 640). For instance, when both suffix tree constructs and pattern match constructs yield a 'no match' scenario, the corresponding dictionary word may be discarded. In addition, even though this proposal sets forth an explicit choice of saving a pattern match state instead of the corresponding full/partial dictionary words, in practice, it may be possible to save the actual dictionary words and use them for further match processing. The choice of saving pattern match state versus dictionary words may be entirely dependent on the hardware/software system on which one or more of the features, described herein, are implemented.

Figure 7A:
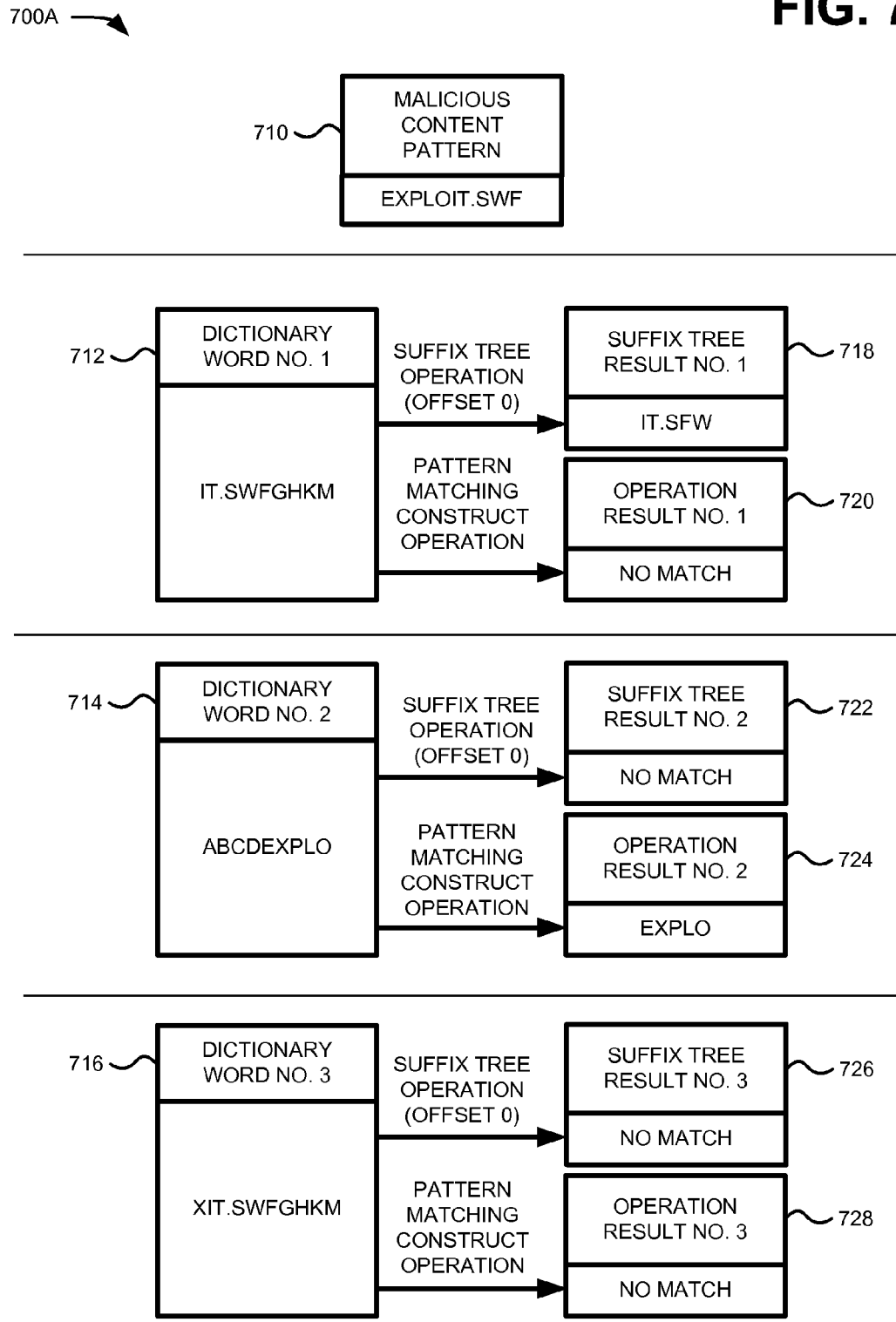
FIGS. 7A-7B are diagrams of example data structures according to one or more implementations described herein.

FIG. 7A is a diagram of example data structures 700A according to one or more implementations described herein. As depicted, data structures 700A may include a malicious content pattern 710, such as "EXPLOIT.SWF," and multiple dictionary words 712, 714, and 716, such as the sequences "IT.SWFGHKM," "ABCDEXPLO," and "XIT.SWFGHKM." Each dictionary word 712, 714, and 716 may be scanned using a suffix tree operation and/or a scanning operation (e.g., a pattern matching construct operation, etc.) to produce one or more types of results (718-728).

As depicted in FIG. 7A, since malicious content pattern 710 includes the sequence "EXPLOIT.SWF" and since dictionary word 712 includes the sequence "IT.SWFGHKM," scanning dictionary word 712 using a suffix tree operation with an offset of 0 may produce a partial match, such as suffix tree result 718 (e.g., the sequence "IT.SWF"). However, for similar reasons, scanning dictionary word 712 using a pattern matching construct operation may produce pattern matching construct operation result 720 (e.g., NO MATCH). Accordingly, as discussed above with reference to FIG. 6, the sequence "IT.SWF" may be stored in memory.

Similarly, since malicious content pattern 710 includes the sequence "EXPLOIT.SWF" and since dictionary word 714 includes the sequence "ABCDEXPLO," scanning dictionary word 714 using a suffix tree operation with an offset of 0 may produce suffix tree result 722 (e.g., NO MATCH). By contrast, for similar reasons, scanning dictionary word 714 using a pattern matching construct operation with an offset of 4 may produce pattern matching construct operation result 724 (e.g., the sequence "EXPLO"). As such, as discussed above with reference to FIG. 6, a partial match state for the sequence "EXPLO" may be stored in memory. As mentioned above, the corresponding dictionary word may not be stored.

Also, since malicious content pattern 710 includes the sequence "EXPLOIT.SWF" and since dictionary word 716 includes the sequence "XIT.SWFGHKM," scanning dictionary word 716 using a suffix tree operation with an offset of 0 may produce suffix tree result 726 (e.g., NO MATCH). For similar reasons, scanning dictionary word 716 using a pattern matching construct operation may produce pattern matching construct operation result 728 (e.g., NO MATCH). Accordingly, as discussed above with reference to FIG. 6, no sequence or match state information may be stored for dictionary word 716. In this manner, network security system 130 may use suffix tree constructs 615 and/or pattern matching constructs 620 to identify dictionary words that may be associated with malicious content. As such, network security system 130 may store only relevant dictionary words and/or relevant portions of dictionary words rather than all dictionary words 610 or dictionary words 610 that are irrelevant to malicious content.

Returning now to FIG. 6, network security system 130 may execute a pattern matching operation 660. As depicted, pattern matching operation 660 may be based on stored matching bytes 635 and/or stored match state 650 from the current and/or prior packets. The stored bytes/states from prior compressed data packets may be used. Additionally, pattern matching operation 660 may be based on a sequence of word references 655 (e.g., relatively short segments of information, within compressed data 605, that are each associated with a dictionary word 610). Pattern matching operation 660 may include one or more processes to compare stored matching bytes 635 and/or stored match state 650, or any combination thereof, to malicious content pattern 710. Pattern matching operation 660 may also, or alternatively, include decompressing, scanning, and/or otherwise verifying that an apparent match does, in fact, correspond to malicious content in compressed data 605.

Figure 7B:
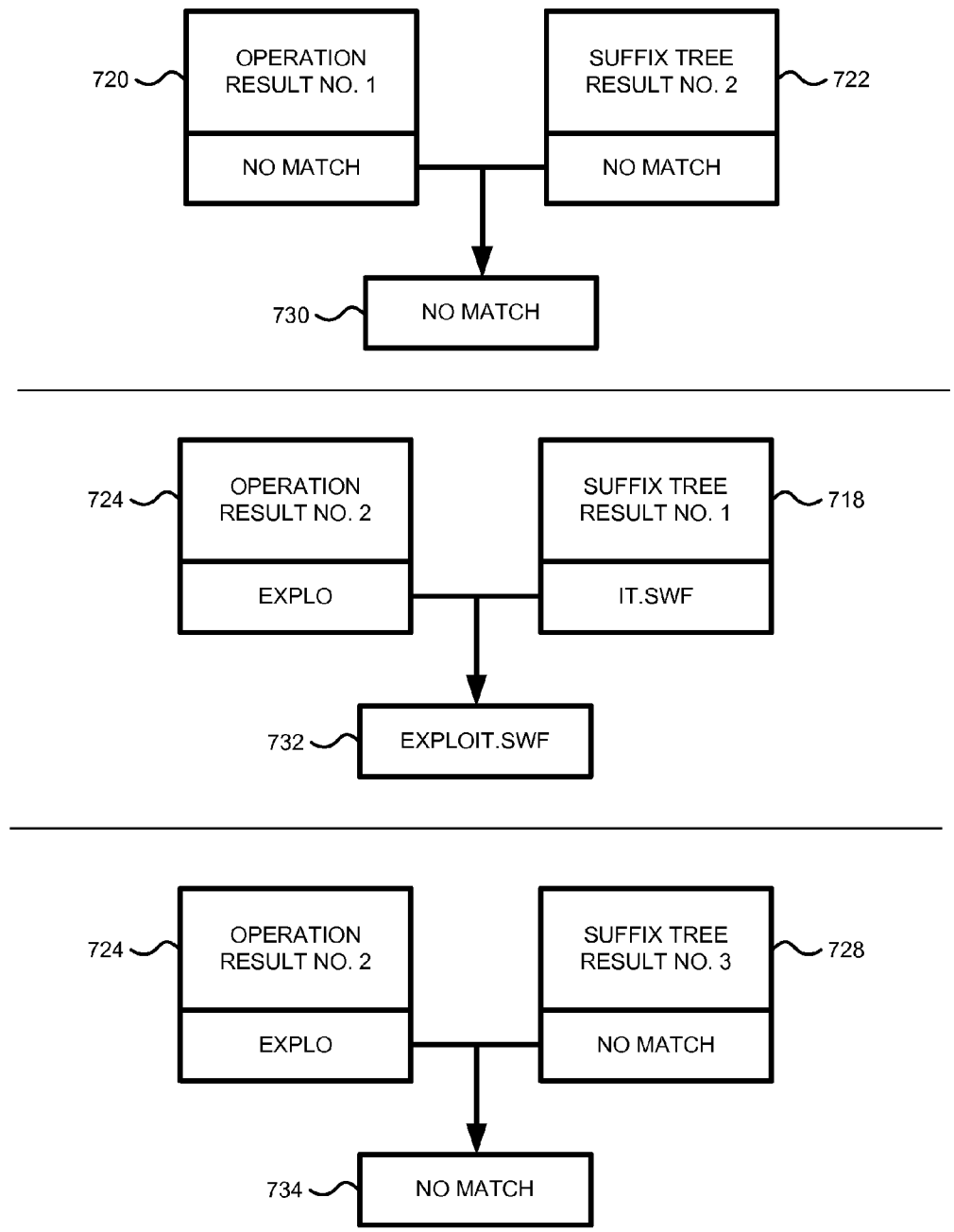

FIG. 7B is a diagram of example data structures 700B according to one or more implementations described herein. As depicted, network security system 130 may combine suffix tree results 718, 722, and 726 with pattern matching construct operation results 720, 724, and 728 to identify malicious content pattern 710 within compressed data 605. For instance, network security system 130 may combine DFA operation result 720 with suffix tree result 722. However, since DFA operation result 720 and suffix tree result 722 did not provide any full matches or partial matches (e.g., NO MATCH 730), network security system 130 may ascertain that a sequential combination of dictionary word 712 and then dictionary word 714 does not correspond to malicious content.

Network security system 130 may also combine DFA operation result 724 with suffix tree result 718. As depicted in FIG. 7B, the combination of DFA operation result 724 with suffix tree result 718 may produce data structure 732 (e.g., the sequence "EXPLOIT.SWF"), which does, in fact, correspond to malicious content 710. As such, network security system 130 may ascertain that sequential references (e.g., sequence of word references) to dictionary word 714 and then dictionary word 712, within compressed data 605, include malicious content.

Network system 130 may also, or alternatively, combine DFA operation result 724 with suffix tree result 728. As illustrated in FIG. 7B, the combination of DFA operation 724 with suffix tree result 728 does not produce a match (e.g., data structure 734) since suffix tree result 728 was a NO MATCH sequence. Accordingly, network security system 130 may ascertain that sequential references to dictionary word 714 and then dictionary word 718 do not correspond to malicious activity within compressed data 605.

Returning again to FIG. 6, match results corresponding to pattern matching operation 660 may be produced. For example, as mentioned above, network security system 130 may produce a notification of the malicious content. In some implementations, the notification may include any type or variety of information, such as information corresponding to the compressed data, the dictionary words, the malicious content, etc. Network security system 130 may also, or alternatively, communicate the notification to another device (e.g., another network device, a user device 110, etc.).

Accordingly, systems and devices, as described herein may be used to identify malicious content within compressed data by examining dictionary words. For example, network security system 130 may receive compressed data, identify dictionary words corresponding to the compressed data, and/or identify malicious content corresponding to the dictionary words. Additionally, or alternatively, the network security system may identify malicious content corresponding to the compressed data and may produce a notification of malicious content. Identifying malicious content corresponding to the dictionary words, prior to identifying the malicious content corresponding to the compressed data, may enhance efficiency by eliminating the need to decompress and inspect certain portions of the compressed data (e.g., portions of the compressed data corresponding to dictionary words that are not associated with malicious content).

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a computing device, compressed data,
        the compressed data including a sequence of references, and
        a particular reference, of the sequence of references, corresponding to a dictionary word used to obtain the compressed data;
    obtaining, by the computing device, dictionary words used to obtain the compressed data,
        the dictionary words including the dictionary word;
    identifying, by the computing device, one or more of the dictionary words that correspond to malicious content;
    identifying, by the computing device, the malicious content corresponding to the compressed data based on the one or more of the dictionary words being part of the dictionary words used to obtain the compressed data; and
    producing, by the computing device, a notification of the malicious content corresponding to the compressed data.

2. The method of claim 1, where obtaining the dictionary words comprises:
    analyzing the compressed data to identify a data decompression application compatible with the compressed data,
    executing the data decompression application, and
    accessing the dictionary words via the data decompression application.

3. The method of claim 1, further comprising:
    storing the one or more of the dictionary words identified as corresponding to the malicious content, and
    discarding a dictionary word, of the dictionary words, that is not identified as corresponding to the malicious content.

4. The method of claim 1, where identifying the one or more of the dictionary words that correspond to the malicious content comprises at least one of:
    performing a first suffix tree operation resulting in a full match scenario between a particular dictionary word, of the one or more of the dictionary words, and a suffix tree pattern,
    performing a second suffix tree operation resulting in a partial match scenario between the particular dictionary word and the suffix tree pattern,
    performing a first pattern matching operation resulting in a full match scenario between the particular dictionary word and a malicious content pattern, or
    performing a second pattern matching operation resulting in a partial match scenario between the particular dictionary word and the malicious content pattern.

5. The method of claim 4, where:
    the partial match scenario between the particular dictionary word and the suffix tree pattern corresponds to a segment end of the particular dictionary word, and
    the partial match scenario between the particular dictionary word and the malicious content pattern results in a match state, corresponding to the partial match scenario between the particular dictionary word and the malicious content pattern, being stored in a memory of the computing device.

6. The method of claim 1, where identifying the one or more of the dictionary words that correspond to the malicious content, comprises:
    performing a suffix tree operation resulting in a partial match scenario between a particular dictionary word, of the one or more of the dictionary words, and a suffix tree pattern,
        the partial match scenario between the particular dictionary word and the suffix tree pattern corresponds to a segment end of the particular dictionary word,
    storing a data segment corresponding to the partial match scenario between the particular dictionary word and the suffix tree pattern,
    performing a pattern matching operation resulting in a partial match scenario between the particular dictionary word and a malicious content pattern,
    storing a match state corresponding to the partial match scenario between the particular dictionary word and the malicious content pattern,
    combining the data segment with the match state to obtain a combination,
    determining that the combination corresponds to the malicious content pattern, and
    identifying the particular word as one of the one or more of the dictionary words that corresponds to the malicious content based on determining that the combination corresponds to the malicious content pattern.

7. The method of claim 1, where identifying the malicious content corresponding to the compressed data based on use of the one or more of the dictionary words comprises:
    decompressing a portion of the compressed data corresponding to the one or more of the dictionary words, and scanning the decompressed portion of the compressed data to identify the malicious content.

8. The method of claim 1, further comprising:
executing a security operation to neutralize a security threat corresponding to the malicious content based on identifying the malicious content corresponding to the compressed data.

9. The method of claim 1, where:
the computing device comprises a network device operating within a network,
the compressed data is received by the network device while the compressed data is in transit between two or more devices communicating in the network, and
the compressed data comprises a portion of a compressed file.

10. A computing device comprising:
a memory; and
a processor, connected to the memory, to:
receive compressed data:
the compressed data comprising a sequence of references, and
the sequence of references corresponding to dictionary words that are used to obtain the compressed data,
obtain the dictionary words that are used to obtain the compressed data,
identify one or more of the dictionary words that correspond to malicious content,
store the one or more of the dictionary words identified as corresponding to the malicious content, and
identify the malicious content corresponding to the one or more of the dictionary words to identify malicious content corresponding based on the one or more of the dictionary words being part of the dictionary words used to obtain the compressed data.

11. The computing device of claim 10, where, when obtaining the dictionary words that are used to obtain the compressed data, the processor is to:
analyze the compressed data to identify a data decompression application compatible with the compressed data, and
use the data decompression application to produce the dictionary words.

12. The computing device of claim 10, where the processor is further to:
provide a notification of the malicious content corresponding to the compressed data.

13. The computing device of claim 10, where, when identifying the one or more of the dictionary words that correspond to the malicious content, the processor is to:
execute a first suffix tree operation resulting in a full match scenario between a particular dictionary word, of the one or more of the dictionary words, and a suffix tree pattern,
execute a second suffix tree operation resulting in a partial match scenario between the particular dictionary word and the suffix tree pattern,
execute a first pattern matching operation resulting in a full match scenario between the particular dictionary word and a malicious content pattern, or
execute a second pattern matching operation resulting in a partial match scenario between the particular dictionary word and the malicious content pattern.

14. The computing device of claim 13, where:
the partial match scenario between the particular dictionary word and the suffix tree pattern corresponds to a segment end of the particular dictionary word, and
the partial match scenario between the particular dictionary word and the malicious content pattern results in a match state, corresponding to the partial match scenario between the particular dictionary word and the malicious content pattern, being stored in a memory of the computing device.

15. The computing device of claim 10, where, when identifying the one or more of the dictionary words that correspond to the malicious content, the processor is to:
execute a suffix tree operation resulting in a partial match scenario between a particular dictionary word, of the one or more of the dictionary words, and a suffix tree pattern,
the partial match scenario between the particular dictionary word and the suffix tree pattern corresponding to a segment end of the particular dictionary word,
store a data segment corresponding to the partial match scenario between the particular dictionary word and the suffix tree pattern,
perform a pattern matching operation resulting in a partial match scenario between the particular dictionary word and a malicious content pattern,
store a match state corresponding to the partial match scenario between the particular dictionary word and a malicious content pattern,
combine the data segment with the match state to obtain a combination,
determine that the combination corresponds to a malicious content pattern, and
identify the particular word as one of the one or more of the dictionary words that corresponds to the malicious content based on determining that the combination corresponds to the malicious content pattern.

16. The computing device of claim 10, where, when identifying the malicious content corresponding to the compressed data, the processor is to:
decompress a portion of the compressed data corresponding to the one or more dictionary words, and
scan the decompressed portion of the compressed data to identify the malicious content.

17. A non-transitory computer-readable storage medium storing instructions, the instructions comprising:
one or more instructions that, when executed by a processor, cause the processor to:
receive compressed data,
the compressed data including a sequence of references, and
a particular reference, of the sequence of references, corresponding to a dictionary word used to obtain the compressed data, obtain dictionary words used to obtain the compressed data,
the dictionary words including the dictionary word,
identify one or more of the dictionary words corresponding to malicious content,
identify the malicious content corresponding to the compressed data based on the one or more of the dictionary words being part of the dictionary words used to obtain the compressed data, and
produce a notification based on the malicious content.

18. The non-transitory computer-readable storage medium of claim 17, where the one or more instructions to identify the one or more of the dictionary words corresponding to the malicious content comprise:
one or more instructions that, when executed by the processor, cause the processor to:

execute a first suffix tree operation resulting in a full match scenario between a particular dictionary word, of the one or more of the dictionary words, and a suffix tree pattern, execute a second suffix tree operation resulting in a partial match scenario between the particular dictionary word and the suffix tree pattern, execute a first pattern matching operation resulting in a full match scenario between the particular dictionary word and a malicious content pattern, or execute a second pattern matching operation resulting in a partial match scenario between the particular dictionary word and the malicious content pattern.

19. The non-transitory computer-readable storage medium of claim 17, where the one or more instructions to identify the one or more of the dictionary words corresponding to the malicious content comprise:

one or more instructions that, when executed by the processor, cause the processor to:

execute a suffix tree operation resulting in a partial match scenario between a particular dictionary word, of the one or more of the dictionary words and a suffix tree pattern, the partial match scenario between the particular dictionary word and the suffix tree pattern corresponding to a segment end of the particular dictionary word, store a data segment corresponding to the partial match scenario between the particular dictionary word and the suffix tree pattern, perform a pattern matching operation resulting in a partial match scenario between the particular dictionary word and a malicious content pattern, store a match state corresponding to the partial match scenario between the particular dictionary word and the malicious content pattern, combine the data segment with the match state to obtain a combination, determine that the combination corresponds to a malicious content pattern, and identify the particular word as one of the one or more of the dictionary words that corresponds to the malicious content based on determining that the combination corresponds to the malicious content pattern.

20. The non-transitory computer-readable storage medium of claim 17, where the instructions further comprise:

one or more instructions that, when executed by the processor, cause the processor to:

store the one or more of the dictionary words identified as corresponding to the malicious content, and discard a particular dictionary word, of the dictionary words, that is not identified as corresponding to the malicious content.

* * * * *